United States Patent
Lu (10) Patent No.: US 7,377,012 B2
(45) Date of Patent: May 27, 2008

(54) AXLE POSITIONING STRUCTURE

(75) Inventor: Ji-Ye Lu, Taoyuan County (TW)

(73) Assignee: Hannspree, Inc., Taipei (TW)

( * ) Notice: Subject to any disclaimer, the term of this patent is extended or adjusted under 35 U.S.C. 154(b) by 210 days.

(21) Appl. No.: 11/280,391

(22) Filed: Nov. 17, 2005

(65) Prior Publication Data

US 2006/0265839 A1 Nov. 30, 2006

(30) Foreign Application Priority Data

May 27, 2005 (TW) .............................. 94208849 U (51) Int. Cl.
*E05D 11/08* (2006.01)
(52) U.S. Cl. .......................................... 16/342; 16/376
(58) Field of Classification Search ..................... 379/ 433.12–433.13; 361/680–683; 16/342, 16/337, 338, 340, 341, 374, 376, 267; 455/575.1, 455/575.4, 575.8, 550.1; 348/373, 794, 333.06, 348/333.05; 248/920–923
See application file for complete search history.

(56) References Cited

U.S. PATENT DOCUMENTS

| | | | | |
|---|---|---|---|---|
| 5,239,731 A * | 8/1993 | Lu | .............. | 16/340 |
| 5,632,066 A * | 5/1997 | Huong | .............. | 16/338 |
| 6,230,365 B1 * | 5/2001 | Lu | .............. | 16/342 |
| 6,470,532 B2 * | 10/2002 | Rude | .............. | 16/335 |
| 6,584,646 B2 * | 7/2003 | Fujita | .............. | 16/342 |

FOREIGN PATENT DOCUMENTS

| | | | |
|---|---|---|---|
| GB | 2286011 A | * | 8/1995 |
| TW | 508040 | | 10/2002 |
| TW | 523127 | | 3/2003 |
| TW | 526962 | | 4/2003 |
| TW | 530864 | | 5/2003 |
| TW | 566816 | | 12/2003 |
| TW | 572574 | | 1/2004 |
| TW | 586635 | | 5/2004 |
| TW | M245281 | | 10/2004 |
| TW | M256670 | | 2/2005 |

\* cited by examiner

*Primary Examiner*—Chuck Y. Mah
(74) *Attorney, Agent, or Firm*—Harness, Dickey & Pierce, P.L.C.

(57) ABSTRACT

An axle positioning structure to provide stable positioning and an automatic reposition function includes an axle and a rotary member. The axle has a stem with an axial tangent surface. The rotary member has a non-continuous annular sleeve slightly larger than the outer diameter of the stem. The annular sleeve has a pressing surface on an end corresponding to the axial tangent surface. The pressing surface can be swiveled away from the axial tangent surface and then press on the perimeter of the stem such that the inner diameter of the annular sleeve is expanded to provide a pressing force for the stable positioning. When the pressing surface is swiveled to the middle portion of the axial tangent surface, the pressing surface escapes from the perimeter of the stem so that the annular sleeve provides a returning force to automatically return to the original position.

8 Claims, 7 Drawing Sheets

AXLE POSITIONING STRUCTURE

CROSS-REFERENCE TO RELATED APPLICATIONS

This non-provisional application claims priority under 35 U.S.C. § 119(a) on Patent Application No(s). 94208849 filed in Taiwan, R.O.C. on May 27, 2005, the entire contents of which are hereby incorporated by reference.

BACKGROUND OF THE INVENTION

1. Field of the Invention

The present invention relates to an axle positioning structure to provide stable positioning and automatic reposition adopted for using on two objects that can rotate relative to each other, and particularly for an electronic device that has a rotary cover.

2. Related Art

Many portable electronic devices such as notebook computers, mobile phones and the like have a host and a display screen. The display screen can be swiveled relative to the host. When not in use, the display screen can be folded over the host to reduce the size and protect the display screen. When in use, the display screen can be swiveled to form an angle with the host for viewing and operation. To generate the relative rotation between the display screen and the host, they must be hinged with an axle. There are many axle positioning techniques disclosed in the prior art. Reference can be found in Taiwan patent publication numbers 508040, 523127, 526962, 530864, 566816, 572574, 586635, M256670, M245281, etc.

When the axle is adopted on notebook computers, the display screen is unfolded to form an angle with the host and maintained at that angle when in use. To do that, some conventional axle positioning structures use a spring or pad to provide a stable positioning force (such as Taiwan patent publication numbers 586635 and M245281); some provide the stable positioning force through the surface structure of the axle (such as Taiwan patent publication numbers 526962, 530864, 566816 and 572574). Whether providing the positioning force through a spring, pad or surface structure, the axle positioning structure is too complex. Fabrication and assembly are difficult and the cost is too high. To resolve the problem of complex structure, Taiwan patent publication No. 508040 discloses an "Axle radial urging structure" that has a friction member including an arched portion corresponding to the outer diameter of the axle and an arch centrum. Through different diameters of the friction member, the arch centrum has an inner diameter smaller than the outer diameter of the axle. Hence the axle is squeezed during rotation, providing a positioning force. The axle also has a milling surface fitting with the arch centrum to form an automatic latching. Taiwan patent publication No. 508040, providing a tapered design to generate the positioning force for squeezing, has a structure simpler than most of the prior arts mentioned above. However, the arch centrum has varying diameters. That may increase difficulties in the production. Moreover, if the fit between the arch centrum and the axle is too loose, the positioning force is too weak and the stable positioning becomes ineffective. On the other hand, if the fit is too tight, the positioning force is too strong, and the rotation becomes difficult or automatic latching could become impossible.

Taiwan patent publication No. M256670 discloses an "Axle structure" that is the continuous-in-part of No. 508040. It has a sleeve formed with the same diameter. The sleeve has a slit and a flat surface on the inner wall. Through the slit and the flat surface, a squeezing force can be provided. And through the flat surface and a corresponding milling surface, automatic folding can be achieved. Taiwan patent publication No. M256670 also discloses a simpler structure. But its design of the same diameter still has difficulties during production. The flat surface has to be formed on the inner wall of the sleeve. As the typical axle used on portable electronic devices is about 5 to 6 mm, to fabricate the flat surface on the inner wall of such a small size is quite difficult.

SUMMARY OF THE INVENTION

In the conventional designs set forth above, such as varying outer diameters of a friction member or fabricating a flat surface on the inner wall of a sleeve, while they overcome the problems of complex structures that adopt the spring, pad or altered surface structure, they do not take into account the fabrication difficulties. Thus they are not the optimal design of the axle positioning structure. Therefore an object of the present invention is to provide an improved axle positioning structure.

The axle positioning structure according to the present invention may couple a first object and a second object, and enable the first object and the second object to be swiveled relative to each other for folding or forming an angle between them. The axle positioning structure includes an axle and a rotary member made of metal. The axle has a fastening rod and a stem extended from the fastening rod. The stem has an axial tangent surface on the perimeter substantially in parallel with the axial direction. The rotary member includes a fastening plate and a non-continuous annular sleeve extended from one end of the fastening plate. The annular sleeve has an inner diameter substantially the same as the outer diameter of the stem. The annular sleeve has an end forming a pressing surface to fit the axial tangent surface. The annular sleeve may encompass the stem with the pressing surface in contact with the axial tangent surface. When the rotary member is swiveled, the pressing surface escapes from the axial tangent surface and presses the perimeter of the stem so that the inner diameter of the annular sleeve is expanded. Due to the characteristics of metal, a returning force of the annular sleeve may become a pressing force applying on the stem. Thereby the rotary member can be anchored on the axle in a stable manner. When the rotary member is swiveled and the pressing surface is turned back to a middle portion of the axial tangent surface, the pressing surface escapes the perimeter of the stem, and the returning force of the annular sleeve automatically returns the annular sleeve to the original position.

According to the present invention, through the coupling and fit of the annular sleeve and the stem, the axle positioning structure can be formed without a complex structure, and achieve stable positioning and automatic returning. Moreover, the pressing surface is formed on the end of the annular sleeve by bending, so it can be fabricated easily and precisely. It is an optimal design of the axle positioning structure.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

The axle positioning structure according to the present invention is used to couple a first object and a second object, and enable the first object and the second object to be swiveled relative to each other for folding or forming an angle. The first object and the second object form an electronic device, which may be a flat display device (especially a liquid crystal display Television (LCD TV), notebook computer, personal digital assistant (PDA), mobile phone, or the like. The first object may be a host and the second object may be a display screen. The display screen may be swiveled relative to the host and folded over the host, or be lifted up to form an angle with the host for viewing. Application of the axle positioning structure is not limited to electronic devices. Any device that requires relative folding and opening can adopt the technique disclosed in the present invention. The following description is based on an embodiment of display equipment with a rotary cover according to the present invention.

Figure 1A:
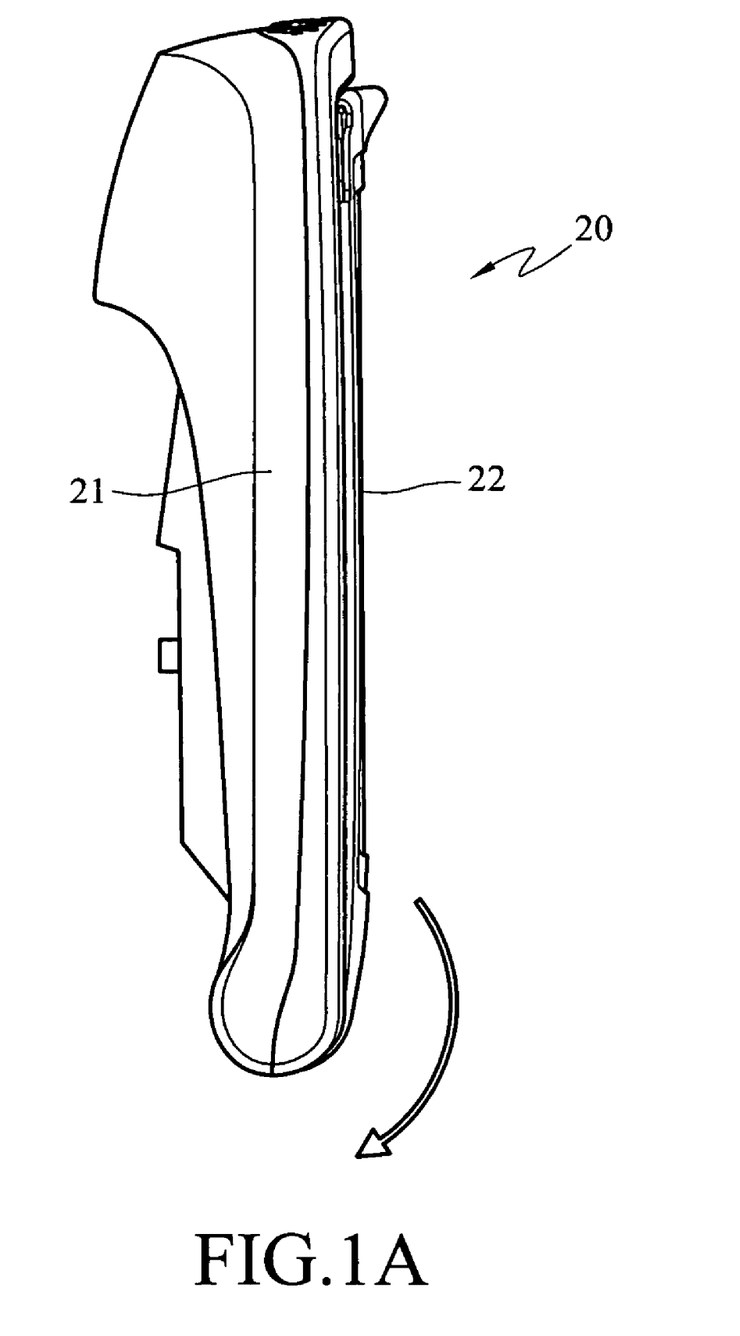
FIGS. 1A to 1C are schematic views of a display device according to the present invention.
Figure 1B:
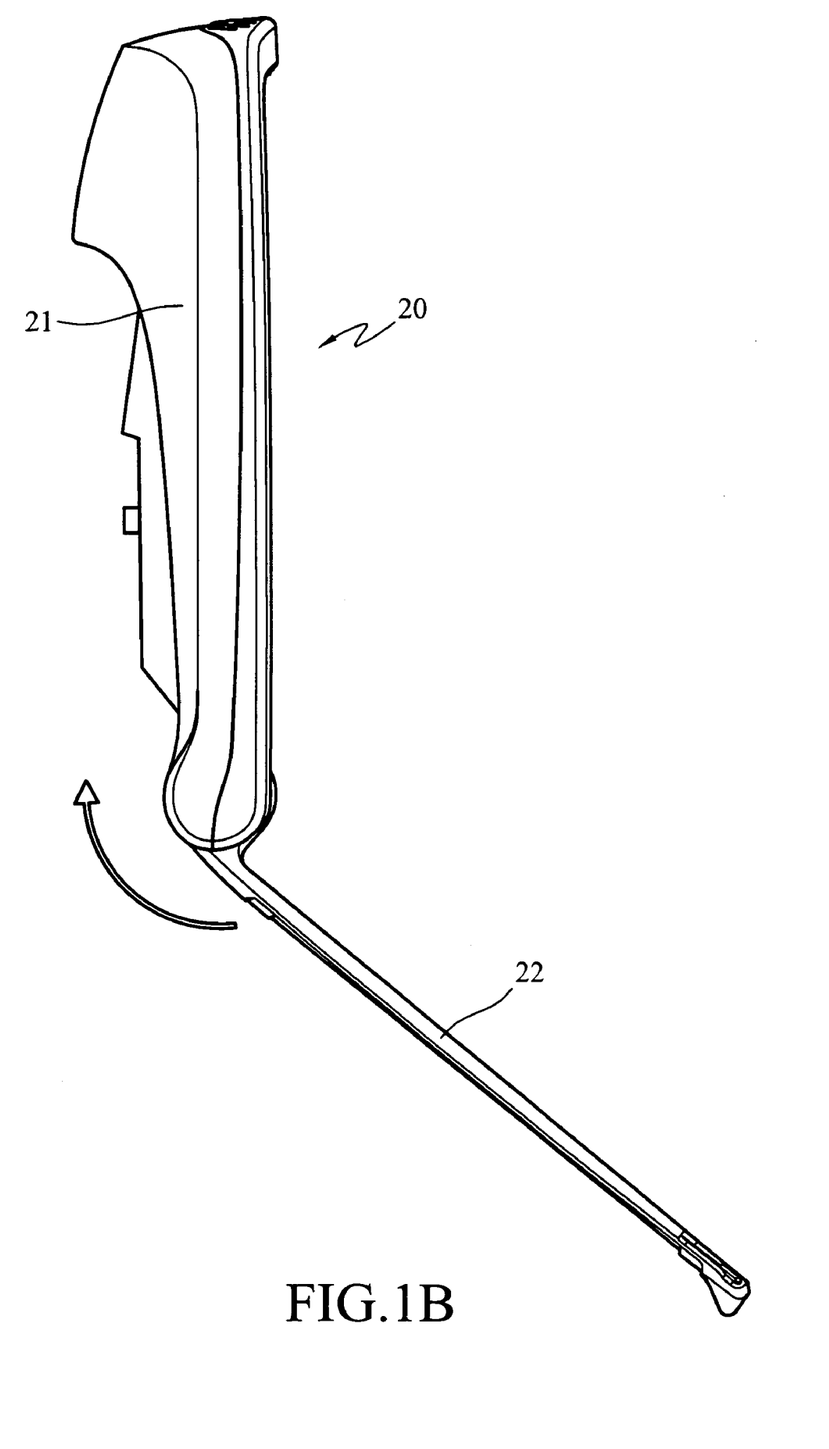
Figure 1C:
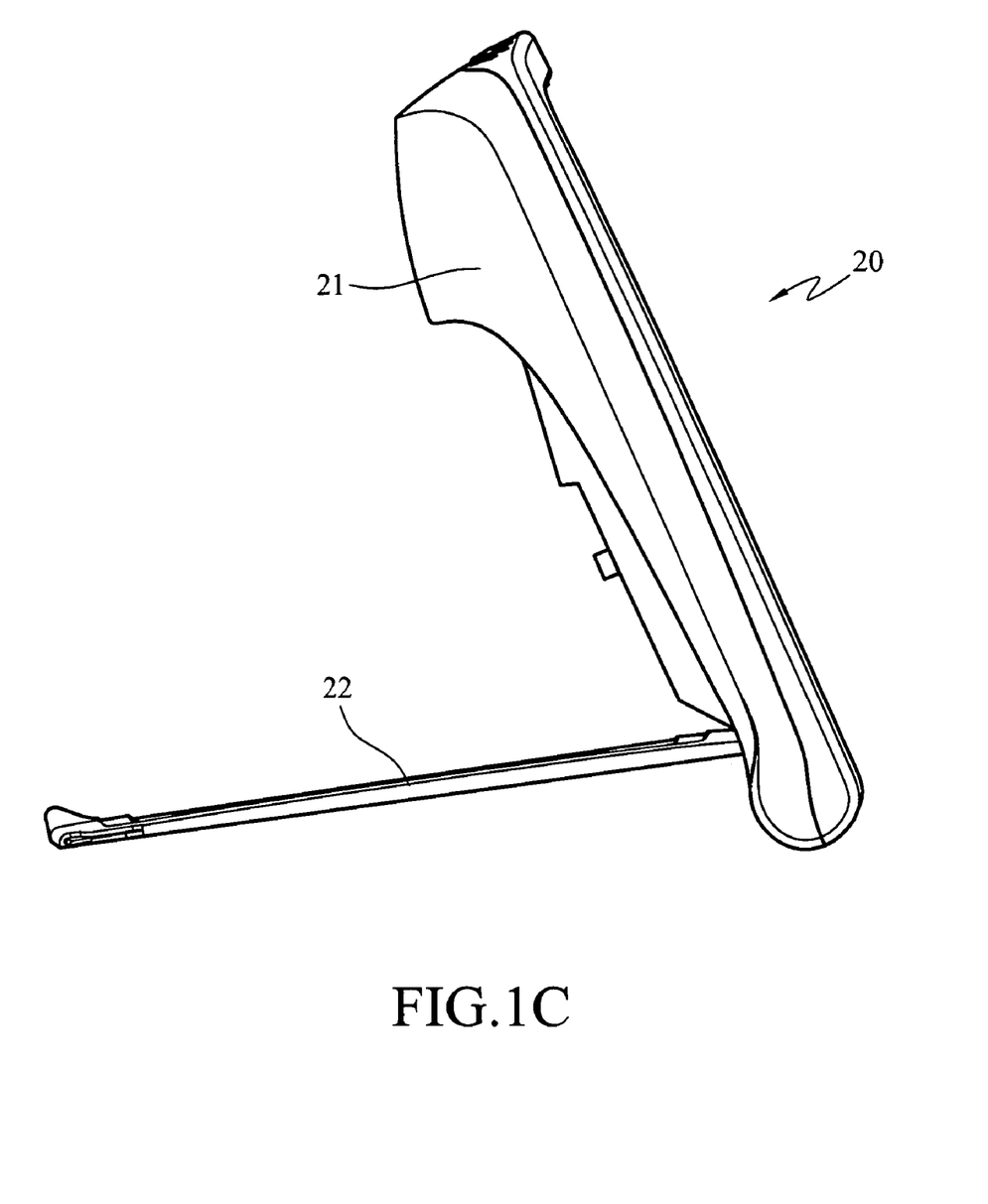

FIGS. 1A, 1B and 1C illustrate an embodiment of an electronic device according to the present invention. The electronic device is a display apparatus 20 that includes a first object 21 (display device) and a second object 22 (cover). The second object 22 is hinged on the lower end of the first object 21 in a swivelable manner through an axle positioning structure 10 (also referring to FIG. 3, and will be discussed later). The second object 22 can be swiveled and folded over the display screen of the first object 21. Referring to FIG. 1A, in the folding state, the second object 22 may protect the display screen of the first object 21, and without relying on any latch hook or positioning apparatus the second object 22 may be flatly onto the first object 21. Referring to FIGS. 1B and 1C, the second object 22 may also be swiveled to the back side of the first object 21 to form an angle, and be a supporting frame to support the first object 21 on a table top.

Figure 2:
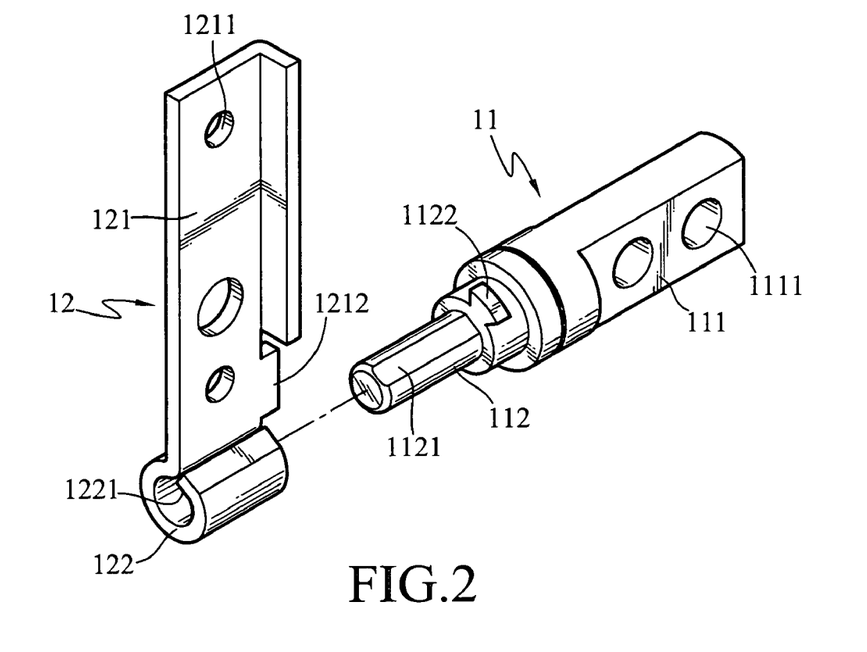
FIGS. 2 and 3 are exploded views of the present invention.
Figure 3:
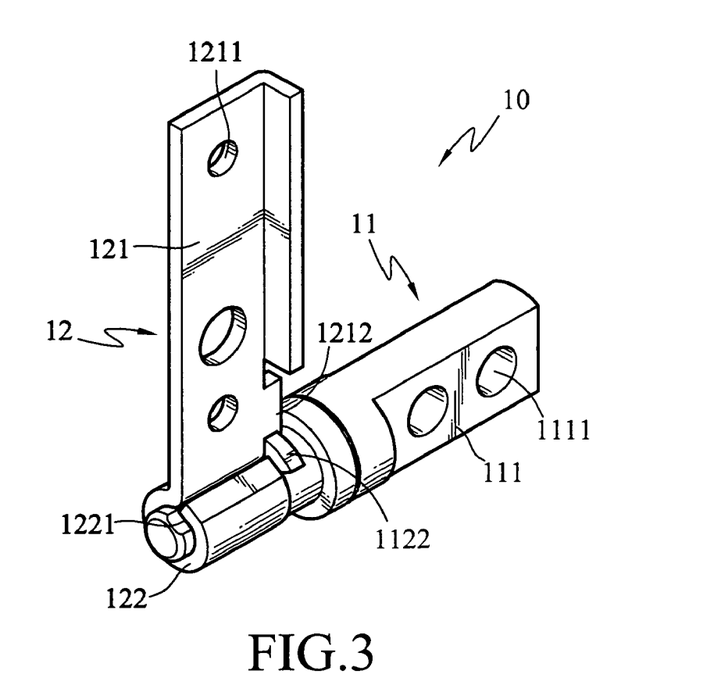

Referring to FIGS. 2 and 3, the axle positioning structure 10 is made of metal, and includes an axle 11 and a rotary member 12. The axle 11 has a fastening rod 111 and a stem 112. The fastening rod 111 has a plurality of holes 1111 to receive fastening elements (not shown) such as screws to fasten the axle 11 to the first object 21. The stem 112 is cylindrical and extended co-axially from the fastening rod 111. The stem 112 has an axial tangent surface 1121 on the perimeter along the axial direction, and a stopper 1122 corresponding to the axial tangent surface 1121.

The rotary member 12 includes a fastening plate 121 and a non-continuous annular sleeve 122 extended from the fastening plate 121. The fastening plate 121 has a plurality of holes 1211 to receive fastening elements (not shown) such as screws to fasten the rotary member 12 to the second object 22. The fastening plate 121 further has a flange plate 1212 adjacent to the juncture of the annular sleeve 122. The annular sleeve 122 is tubular with a diameter substantially the same as the outer diameter of the stem 112. The annular sleeve 122 has an end spaced from the fastening plate 121, thereby forming an uncompleted circle in side view, and a pressing surface 1221 may extend on the end corresponding to the axial tangent surface 1121. The central line of the pressing surface 1221 is spaced from the center line of the annular sleeve 122 at a distance smaller than the inner radius of the annular sleeve 122.

Figures 4A, 4B:
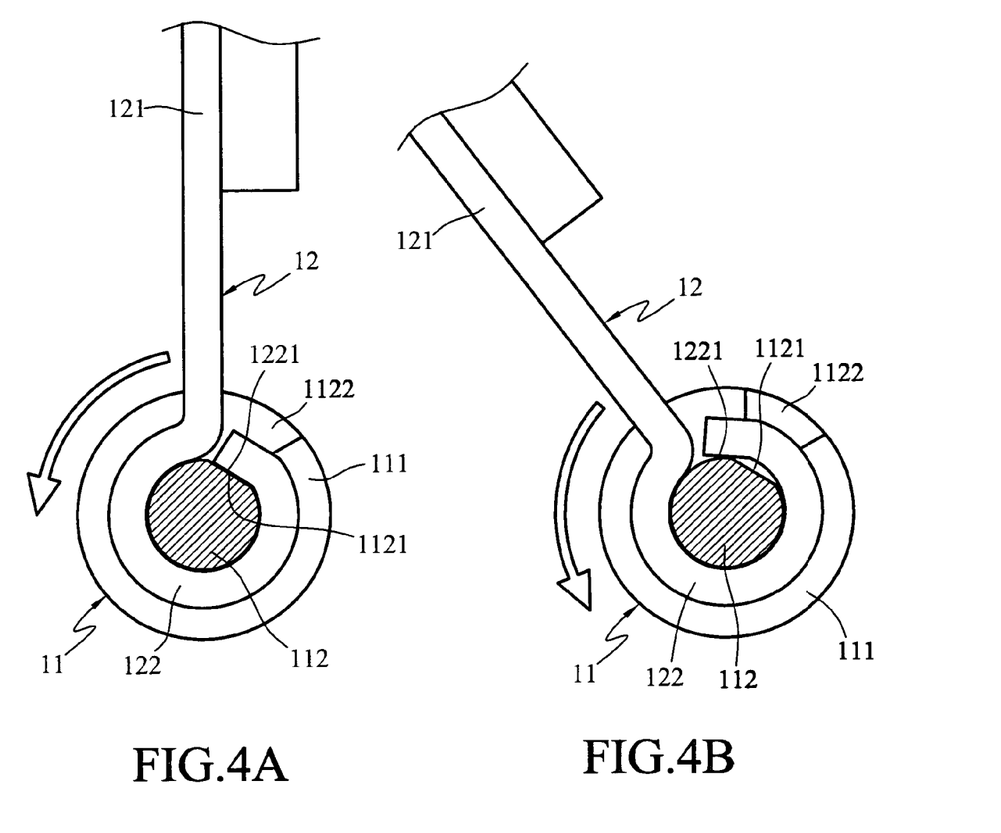
FIGS. 4A to 4F are schematic views showing the operation of the present invention.
Figure 4C:
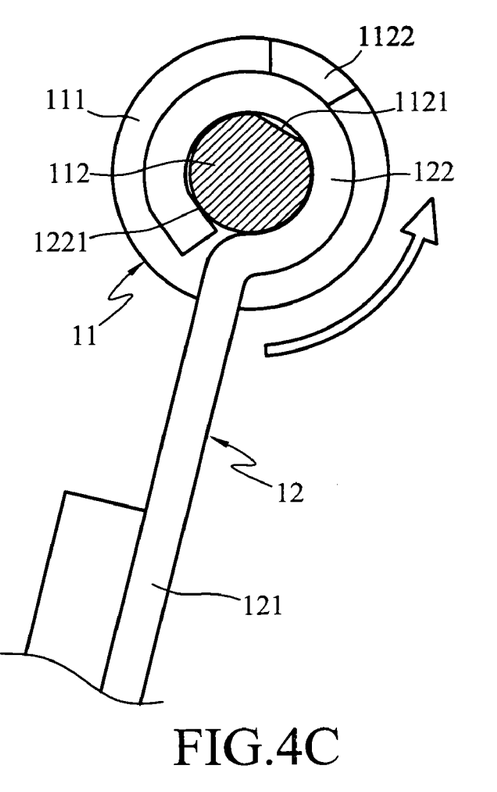
Figure 4D:
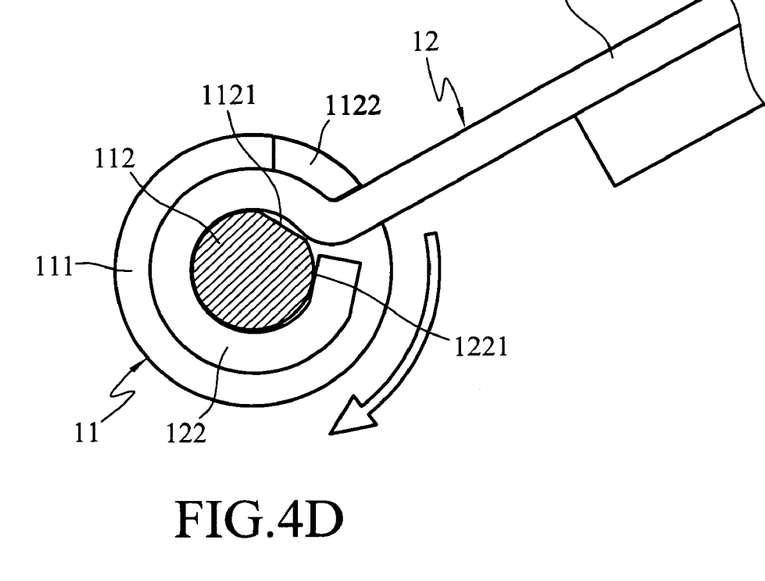
Figure 4E:
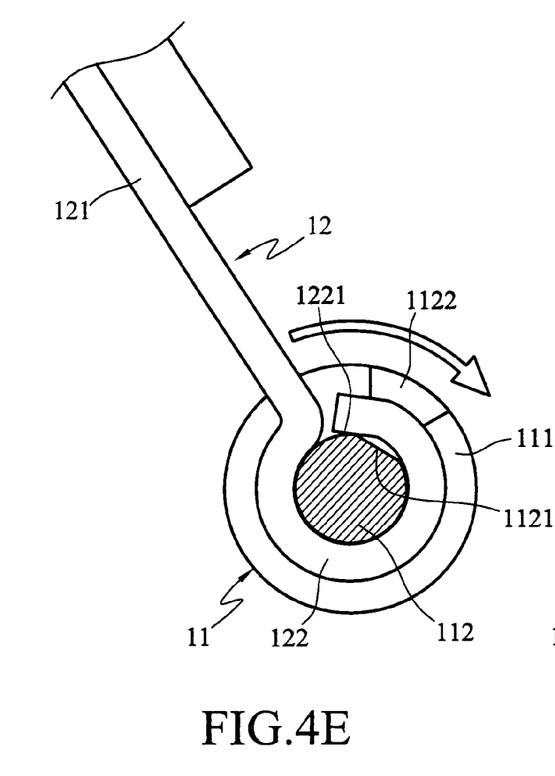
Figure 4F:
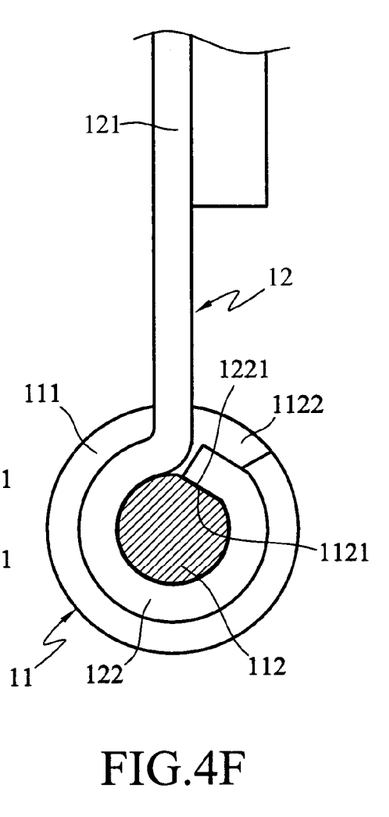

The annular sleeve 122 of the rotary member 12 corresponds to and is coupled with the stem 112 of the axle 11, with the pressing surface 1221 corresponding to the axial tangent surface 1121. The annular sleeve 122, stem 112, pressing surface 1221 and axial tangent surface 1121 form a close fit. Referring to FIGS. 4A through 4F, in normal state, the annular sleeve 122 encompasses the stem 112. The rotary member 12 may be swiveled around the axle 11 under a force (referring to FIG. 4A), so that the pressing surface 1221 escapes from the axial tangent surface 1121. As the central line of the pressing surface 1221 is spaced from the center line of the annular sleeve 122 at a distance smaller than the inner radius of the annular sleeve 122, the pressing surface 1221 may slightly expand the annular sleeve 122. Due to the characteristics of metal, a returning force of the annular sleeve 122 may become a pressing force applied on the surface of the stem 112. Hence the rotary member 12 may be anchored on the axle 11 in a stable manner to maintain the swiveled angle (as shown in FIG. 4B). When the force is continuously applied on the rotary member 12, the rotary member 12 may anchor at any desired position of the axle 11, and the angle between the rotary member 12 and the axle 11 may be altered. When the rotary member 12 is swiveled, and the flange plate 1212 hits the stopper 1122, the rotary member 12 is stopped and cannot be swiveled further (referring to FIGS. 4C and 4D). Thus the rotary member 12 can be swiveled relative to the axle 11 about 300 degrees. Of course, by manufacturing the stopper 1122 on different positions, the maximum swiveling angle between the rotary member 12 and the axle 11 may be altered as desired.

To return the rotary member 12, apply a force to turn back the rotary member 12. When the pressing surface 1221 is swiveled to the middle portion of the corresponding axial tangent surface 1121 (referring to FIG. 4E), the compressed returning force of the pressing surface 1221 drives the annular sleeve 122 so that the pressing surface 1221 returns automatically to be in contact with the axial tangent surface 1121 at the original position (referring to FIG. 4F).

Referring to FIGS. 1A, 1B and 1C, in the display apparatus 20, the second object 22 (cover) is hinged on the first object 21 (display device) through the axle positioning structure 10 of the present invention, and they can be swiveled relative to each other. In normal state, based on the fit of the axle 11 and the rotary member 12, when no external force is applied, the second object 22 is folded over and makes contact with the first object 21 to provide protection. When a force is applied to an end of the second object 22, the distance between the edge and the hinged location becomes a force arm to enable the second object 22 to easily rotate around the first object 21. When the force is released, the second object 22 is anchored and maintained at a desired position corresponding to the first object 21. If the force is applied continuously, the second object 22 may be swiveled to the back side of the first object 21 so that the second object 22 can be a supporting frame to support the first object 21 on a table top to facilitate user viewing or operation. When folding the second object 22 over the first object 21, the weight of the second object 22 may help the movement so that when the second object 22 is moved close to the first object 21 (referring to FIG. 4E, the pressing surface 1221 is close to the middle portion of the axial tangent surface 1121), the second object 22 can automatically fold over and make contact with the first object 21. Thus there is no need to provide hooks or other fastening elements.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An axle positioning structure, comprising:
    an axle having a fastening rod and a stem extended from the fastening rod, the stem being a cylindrical shape with a plane surface extending axially, the stem including a stopper corresponding to the plane surface; and
    a rotary member rotatably connected to the axle, the rotary member having a fastening plate and a non-continuous annular sleeve extended from the fastening plate, the fastening plate including a flange plate adjacent to the annular sleeve, the flange plate adapted to engage the stopper to restrict the axle to be swiveled relative to the rotary member in a predetermined range, the annular sleeve fitting the outer diameter of the stem to be coupled with the stem, the annular sleeve having a pressing surface extended from an end of the annular sleeve, the pressing surface corresponding to the plane surface, a center line of the pressing surface spaced from a center line of the annular sleeve at a distance smaller than the inner radius of the annular sleeve.

2. The axle positioning structure of claim 1, wherein the fastening rod comprises a plurality of holes for fastening.

3. The axle positioning structure of claim 1, wherein the fastening plate comprises a plurality of holes for fastening.

4. The axle positioning structure of claim 1, wherein the stopper is located on an end of the stem corresponding to the plane surface.

5. An electronic device, comprising:
    a first object; and
    a second object hinged on the first object through an axle positioning structure;
    wherein the axle positioning structure includes:
        an axle having a fastening rod and a stem extended from the fastening rod, the stem being a cylindrical shape with a plane surface extending axially, the stem including a stopper corresponding to the plane surface; and
        a rotary member, rotatably connected to the axle, the rotary member having a fastening plate and a non-continuous annular sleeve extended from the fastening plate, the fastening plate including a flange plate adjacent to the annular sleeve, the flange plate adapted to engage the stopper to restrict the axle to be swiveled relative to the rotary member in a predetermined range, the annular sleeve fitting the outer diameter of the stem to be coupled with the stem, the annular sleeve having a pressing surface extended from an end of the annular sleeve, the pressing surface corresponding to the plane surface, a center line of the pressing surface spaced from a center line of the annular sleeve at a distance smaller than the inner radius of the annular sleeve.

6. The electronic device of claim 5, wherein the fastening rod comprises a plurality of holes for fastening.

7. The electronic device of claim 5, wherein the fastening plate comprises a plurality of holes for fastening.

8. The electronic device of claim 5, wherein the stopper is located on an end of the stem corresponding to the plane surface.

* * * * *